United States Patent [19]

Johnston

[11] Patent Number: 4,926,778

[45] Date of Patent: May 22, 1990

[54] AERODYNAMIC STABILIZATION SYSTEM FOR WATERCRAFT

[76] Inventor: Daniel D. Johnston, 335 "I" Ave., Coronado, Calif. 92118

[21] Appl. No.: 216,101

[22] Filed: Jul. 5, 1988

[51] Int. Cl.$^5$ .......................... B63B 1/32; B63B 39/04
[52] U.S. Cl. ...................................... 114/273; 114/121
[58] Field of Search ............... 114/271, 272, 273, 275, 114/121; 244/45 R, 79, 89

[56] References Cited

U.S. PATENT DOCUMENTS

| | | | |
|---|---|---|---|
| 2,550,806 | 5/1951 | Hammond | 244/79 |
| 3,469,550 | 9/1969 | Priestley | 114/275 |
| 3,960,103 | 6/1976 | Rey | 114/273 X |
| 4,284,027 | 8/1981 | Montez | 114/273 |
| 4,348,977 | 9/1982 | Okajima | 114/273 |
| 4,685,641 | 8/1987 | Kirsch et al. | 114/272 X |
| 4,827,862 | 5/1989 | Enriquez | 114/273 |

Primary Examiner—Sherman D. Basinger
Attorney, Agent, or Firm—Baker, Maxham, Jester & Meador

[57] ABSTRACT

A high speed planing watercraft includes a pitch stabilization system having variable pitch canard airfoils controlled by a control system incorporating a gyroscope for accommodating constantly changing hydrodynamic forces on the hull.

17 Claims, 6 Drawing Sheets

AERODYNAMIC STABILIZATION SYSTEM FOR WATERCRAFT

BACKGROUND OF THE INVENTION

The present invention relates to stabilization of high speed watercraft and pertains particularly to an aerodynamic stabilization system for planing watercraft.

Watercraft are typically of either the displacement hull or planing hull type. Higher speed boats are typically of the planing hull type wherein the hull rides on the surface of the water at planing speeds. Both types of hulls have stabilization problems under certain rough sea conditions.

Stabilization of displacement hull vessels in the rolling plane has been practiced for some time, and is accomplished by the use of hydrodynamic surfaces below the waterline. These dynamic surfaces are usually positioned hydraulically by means of a signaling command automatically directed by a gyroscope within the hull of the vessel.

Planing craft tend to become unstable in the longitudinal mode at high speed in certain sea conditions. This instability is mainly caused by the rapid change in the position of hydrodynamic support forces on the hull. These changes in support result particularly as a result of rough surface conditions. Because of the nature of these vessels, under-the-water control surfaces cannot be used for stabilization.

Another approach to stabilization is that of a rapid change or shift in the position of weight carried by the vessel which can counter the change in the hydrodynamic forces. This can restore and maintain stability in the craft. This approach, however, is also impractical for high speed craft.

The present invention has been devised to provide an improved solution to these problems of stability for high speed watercraft.

SUMMARY AND OBJECTS OF THE INVENTION

It is the primary object of the present invention to provide an improved stabilization system for high speed watercraft.

In accordance with a primary aspect of the present invention, a high speed watercraft is provided with variable airfoils at the bow, with control means for establishing a reference plane, and means for varying the airfoils for maintaining said hull substantially aligned with said plane.

BRIEF DESCRIPTION OF THE DRAWINGS

The above and other objects and advantages of the present invention will become apparent from the following description when read in conjunction with the accompanying drawings wherein.

DETAILED DESCRIPTION OF A PREFERRED EMBODIMENT

Figure 1:
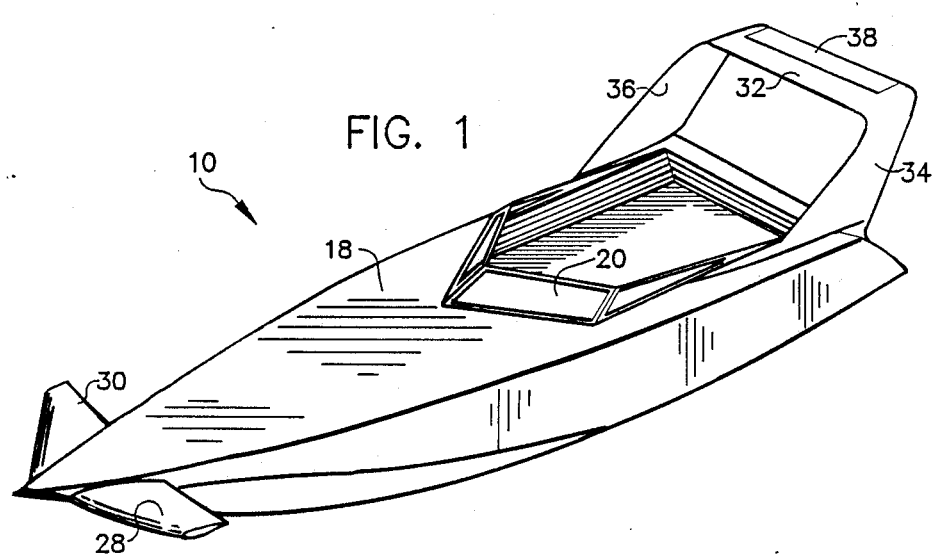
FIG. 1 is a perspective view illustrating a high speed watercraft embodying a preferred embodiment of the present invention.

Referring to FIG. 1 of the drawings, there is illustrated a planing hull watercraft or boat, designated generally by the numeral 10, which incorporates or embodies a preferred embodiment of the present invention. The boat 10 is of the high speed planing hull type, such as disclosed in my U.S. Pat. No. 4,744,320 granted May 17, 1988.

The boat as illustrated, comprises a hull 12 having a somewhat conventional V-shape. It has a pointed bow 14, and converges to a somewhat flat bottom (not visible), and extends rearwardly to a vertically inclined stern 16. A generally flat planar deck 18 covers the hull, and a cockpit windshield and/or cabin structure 20 projects upward from the deck around the cockpit near the rear of the vessel. The hull is of the type typically used on high speed sports craft that operate in the range of from about thirty (30) miles per hour and above. The hull is typically on the order of about sixty to seventy feet in length. However, the system of the present invention may be used in high speed boats of lesser or greater length.

Figure 3:
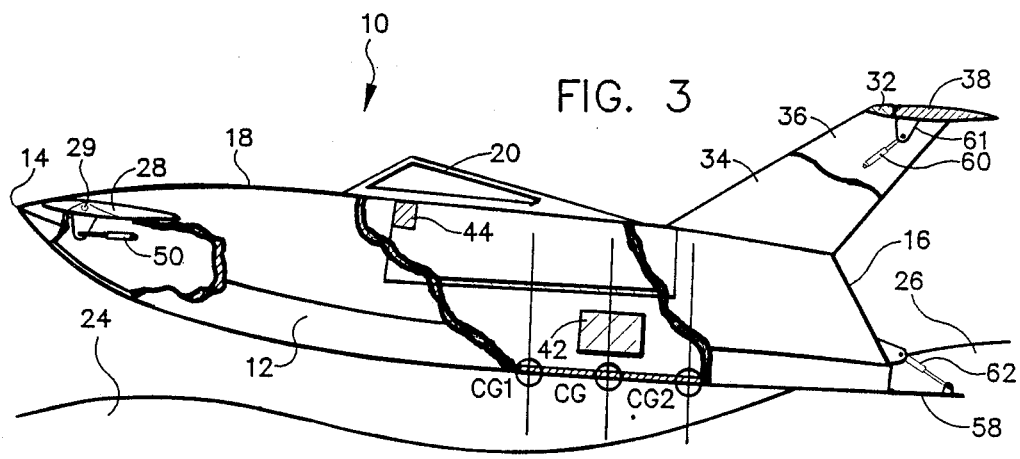
FIG. 3 is a side elevation view of the watercraft of FIG. 1 with portions, broken away to reveal details.

The hull is illustrated in FIG. 3 as moving forward in a body of water having waves or swells 24 and 26, with the hull of the boat shown moving off of swell or wave 26 and approaching swell 24. The hull is presently supported at the stern by the swell 26 and is about to move off swell 26 and engage swell 24 wherein it will be supported temporarily (or instantaneously) at the bow by swell 24. The hull is a planing hull and rides substantially on the upper surface of the body of water wherein the bow is normally slightly higher than the stern when in the planing mode. The support force on the hull constantly changes as a result of the rough surface of the water due to waves and swells. The center of gravity designated as CG is shown shifting from alternatively between the normal center of gravity CG to fore and aft toward centers of gravity or centers of force CG1 and CG2.

This shifting in the center of gravity is a result of forces applied to the undersurface of the hull by the contact with the body of water. This rapid change in the position of hydrodynamic support on the planing hull results in instability, particularly in the fore and aft or pitch mode. The center of force on the hull therefore shifts longitudinally along the longitudinal center line or axis of the hull, alternately forcing the bow up and down as the hull hits waves and swells as it moves over the surface of the water.

Figure 2:
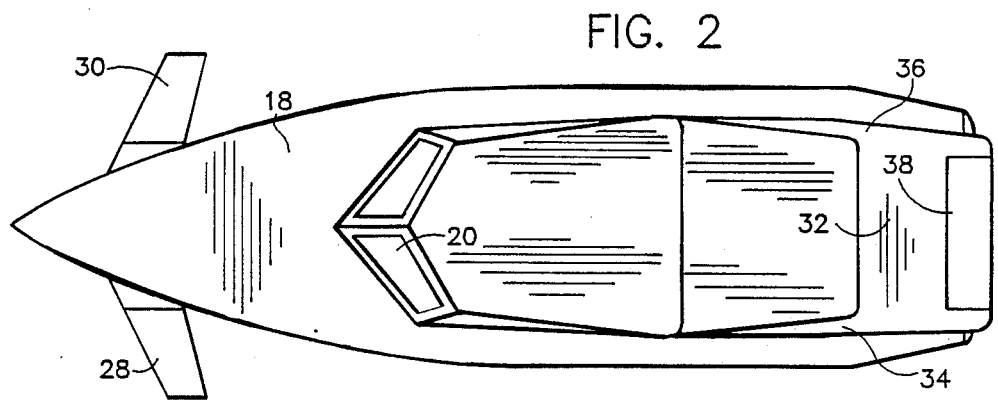
FIG. 2 is a top plan view of the watercraft of FIG. 1.

The present system is constructed to utilize the force of air or aerodynamics to counteract the constantly changing positions of the hydrodynamic forces acting on the hull. The present system, as illustrated in FIGS. 1, 2 and 3, comprises a canard airfoil system with airfoils mounted at the forward end of the hull. More specifically, a variable angle airfoil 28 and a variable airfoil 30 are pivotally mounted to the bow or forward end of the hull, just at or below the deck surface. These airfoils 28 and 30 are pivotally mounted to a common support shaft (FIG. 3) that and extend outwardly from the sides of the forward end of the hull just slightly below the deck surface. The airfoils slope or sweep backward in plan view, and each has a length of about twenty-four inches. The chord length at the base is about eighteen inches, with the length at the tip being about twelve inches.

The normal chord line or angle of the airfoils is about three degrees to the horizontal and pivoted to angles of twenty degrees and ten degrees above and below the chord line, respectively. The pitch or angle of attack of the airfoils 28 and 30 is automatically varied by a control system, which is illustrated in block diagram form in FIG. 4. This control system constantly changes the pitch of the airfoils to counteract the hydrodynamic forces on the hull. In its preferred form the system is designed to counter pitch forces, but may be modified by the addition of other axis of control. The pitch forces are forces of major concern for high speed planing hulls.

In the illustrated embodiment, a second airfoil or wing assembly is mounted above and at the stern of the hull and includes a fixed airfoil 32 with a movable elevator 38. The fixed airfoil 32 is supported on a pair of upwardly extending struts 34 and 36 which may also serve as vertical stabilizers extending above and aft of the cockpit of the hull. The variable pitch airfoil or elevator 38 is pivotally mounted to the aft or trailing edge of the fixed airfoil 32 and is moved by the control system of FIG. 4 for aiding in establishing and maintaining the longitudinal stability of the hull. The wing 32 has a chord angle of about seven degrees, with the elevator 38 being pivotal to angles of fifteen degrees and thirty degrees above and below the chord angle, respectively.

Variation in the pitch angle of the airfoils 28, 30 and 38 changes the aerodynamic forces acting on the hull as a result of its forward speed to counteract the hydrodynamic forces acting on it. The control system is a fast acting highly sensitive system capable of making instantaneous corrections in the aerodynamic controls and resulting forces.

The system is preferably designed to control the stability of the boat about the pitch axis. However, it may be modified to control it about both the pitch and the roll axis. The preferred embodiment described herein counteracts the instantaneous pitch forces. A substantially constant roll force, such as a crosswind will be normally controlled by trim of the hydroplanes, but could be controlled by separately moving the forward airfoils to different angles of attack.

In the preferred embodiment, the forward or front airfoils 28 and 30 are movable together by means of a bow servomotor 50 to control the pitch of the hull. The servomotor 50 (FIG. 3) is pivotally connected to a hinge arm or tab 51 which extends from the airfoil 28. The canard airfoils 28 and 30 are rigidly connected to the same support shaft 29. However, where it is desired to independently twist the airfoils 28 and 30, the airfoils are separately journaled and twisted by separate servomotors.

The illustrated stern or aft airfoil arrangement is capable or effective to control pitch only. The elevator 38 is controlled by means of a servomotor 60 (FIG. 3), again pivotally connected at one end to a hinge arm or tab 61 extending from the elevator 38. This elevator is supported by shafts on other hinge means not illustrated.

Figure 4:
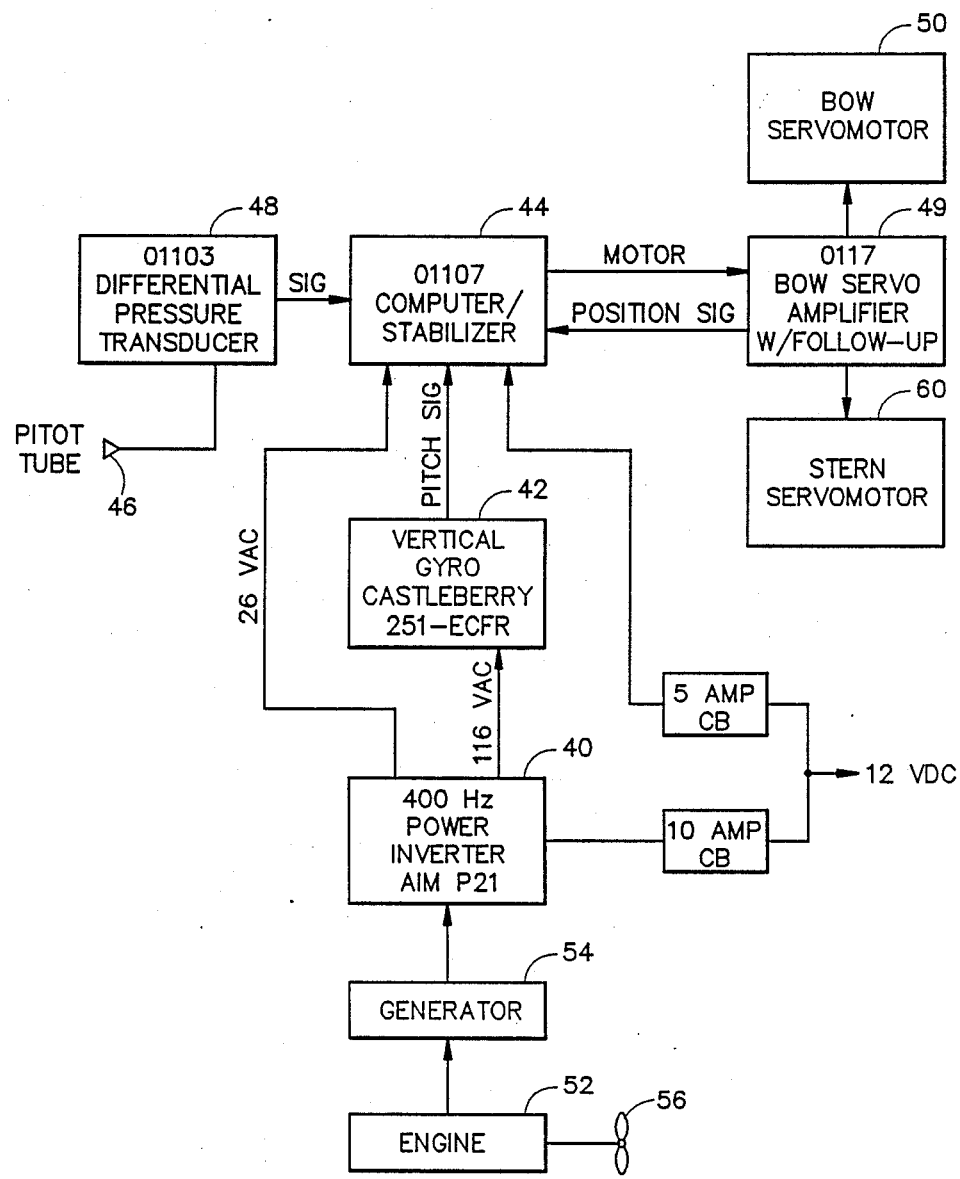
FIG. 4 is a block diagram illustrating the control system of the preferred embodiment.

The control system illustrated in FIG. 4 includes means for establishing a reference axis or plane (i.e. relative to the horizon) and means for sensing the deviation of the tilt or pitch of the deck or hull relative to the reference. The control system further includes means for generating a signal which activates a power system, including servomotors for varying the pitch of the airfoils. The component parts of the system are aircraft auto-pilot components and are available from commercial manufacturers as off-the-shelf items. These components are modified as necessary to suit the particular conditions and environment of watercraft.

The engine 52 (FIG. 4) of the boat drives a generator 54. The boat is driven through the water by means of one or more propellers or screws 56 through the usual gearing drive shaft. A 400 Hz power inverter 40 is connected to the generator 54 and supplies 115 VAC to power the drive or spin motor of a gyro 42. The power inverter also supplies 26 VAC and 12 VDC to a computer/stabilizer unit 44. The computer/stabilizer unit 44 contains electronic circuitry that controls the servomotors 50 and 60 via servo/amplifier 49. A suitable computer/stabilizer unit is available from S-TEC Corporation Mineral Wells, Texas as part No. 01107.

An air speed sensor, such as a pito tube 46 coupled to a differential pressure transducer 48, responds to air speed and sends a signal representative thereof to the computer/stabilizer unit 44. A suitable speed sensor is available from Micro Switch, Freeport, Ill. as part number 142PC01D, and is available with electrical connections and packaging from S-TEC as a complete assembly as part No. 01107. The computer/stabilizer unit 44 is programmed to respond to signals from the gyro 42 and to signals from the servos to send the appropriate control signals to maintain the desired pitch angle of the hull. One suitable servo for use as bow servo unit 50 is available with a DC motor from Globe Motors, Dayton Ohio, and in a package including gear box and electronic follow-up element as part No. 01117 S-TEC.

The gyro 42 may be any suitable type such as a type frequently used in aircraft for sensing movement about one axis. One suitable type is an aircraft grade attitude reference gyro with autopilot pick-offs and a 115 VAC spin motor. These gyros are available from Castleberry Instruments, Austin, Texas as part No. 251-DCFR. The gyro 42 is preferably mounted at or near the center of dynamic pressure and pitch axis of the boat. The gyro base or support is rigidly mounted to the frame or deck of the boat and senses deviations of the pitch of the deck from a reference norm (i.e., the normal planing attitude of the hull) and generates a signal representative of the deviation. This deviation signal is transmitted to the computer/stabilizer unit 44 which activates the airfoil servomotors to change the pitch of the airfoil, if necessary to counter dynamic forces on the hull.

A suitable power inverter is available as an aircraft grade unit from the aforementioned Castleberry Instruments as part No. p21. Deck angle changes produce a 400 Hz gyro signal, which is routed to and converted by the computer/stabilizer to proportional DC, and amplified via bow servo amplifier 49 to drive the canard actuator servo motor 50 and the aft elevator actuator servomotor 60. The motors for the airfoils may be either hydraulic or electric and are positioned in accordance with a correction signal sent by the computer/stabilizer control unit 44. The illustrated embodiment illustrates an electrical system wherein the motor or motors for varying the airfoils are electrical.

Another pitch control means in the form of one or more water engaging trim tabs 58 (FIG. 3) may be pivotally attached to the stern of the boat. The trim tabs 58 are controlled by servomotors such as 62, which may also be controlled by the above described control system although this is not shown in FIG. 4. The trim tabs 58 form an extension of the planing surface of the hull and pivot about fifteen degrees above and below the plane of the bottom of the hull to provide either positive or negative pressure on the hull to counteract the hydrodynamic forces of instability.

Figure 5:
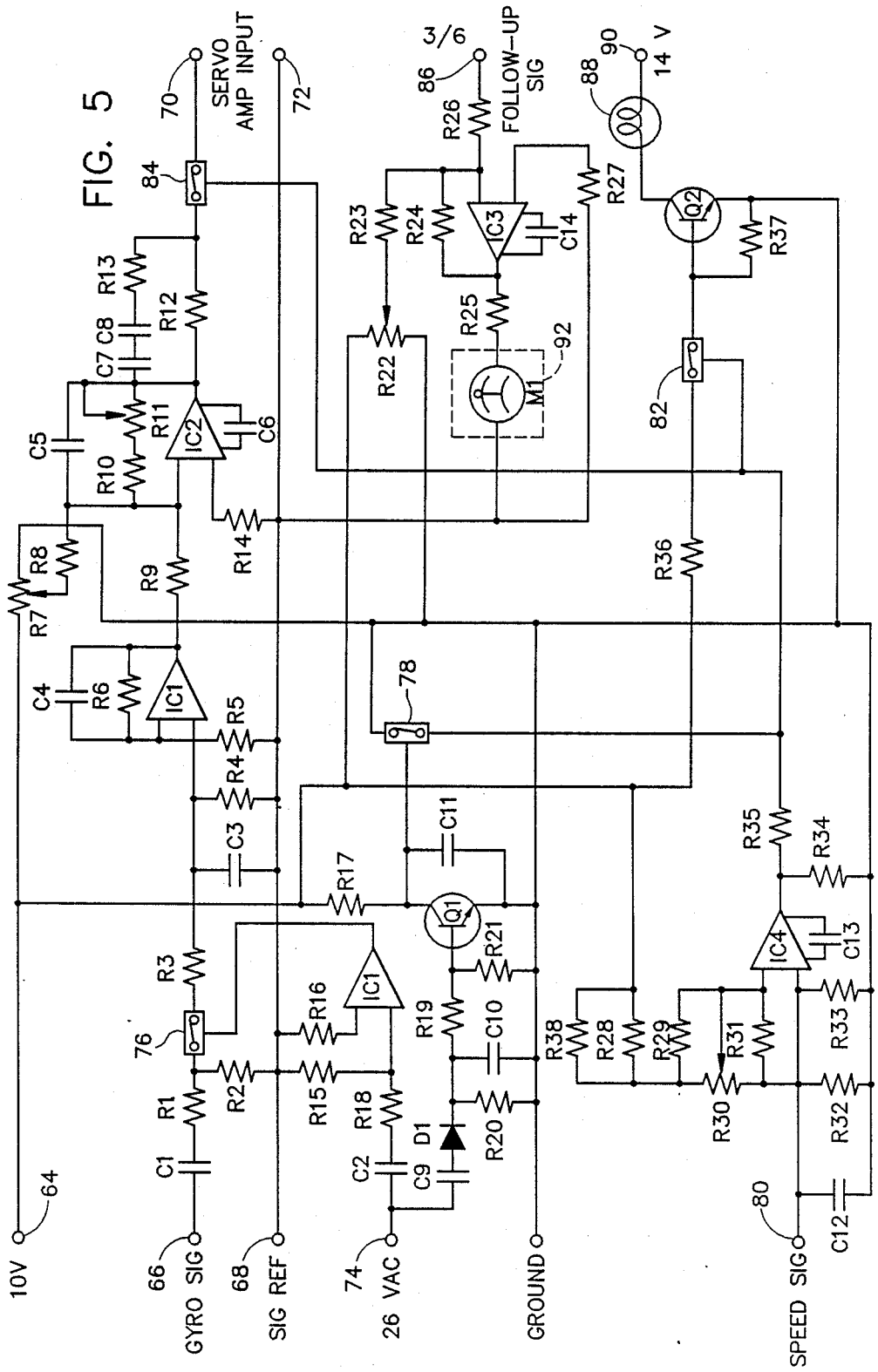
FIG. 5 is a schematic diagram illustrating circuitry for the computer/stabilizer block of the control system of FIG. 4.

FIG. 5 is a schematic diagram of an exemplary circuit for the computer/stabilizer unit 44. A ten volt input at 64 powers the amplifier circuit which receives a gyro signal at 66, and a reference signal at 68 processes them. The unit 44 then sends the necessary control signals via lines 70 and 72 to the servo amplifier circuit of FIG. 6 which processes it to activate the servomotors. A 26 VAC input 74 provides power to the servomotors through the servo amplifier. Power input at 74 activates switch 76 to couple the gyro to the system, and switch 78 to couple the speed signal from the speed sensor 46, 48 input at 80.

A speed signal activates switches 82 and 84 for coupling the servo units 50 and 60. A follow-up signal from the servo amplifier is input at 86. An indicator light 88 signals that the set or active speed has been reached. A test indicator 92 is used in testing and adjusting the system. By way of example, R11 is adjusted for 5 VDC at pin G of IC2 with 5 degree pitch gyro attitude. All resistors are ⅛ W, 1% and are called out in ohms. All capacitor values are shown in microfareds unless noted. All diodes are IN4444 unless noted.

Figure 6A:
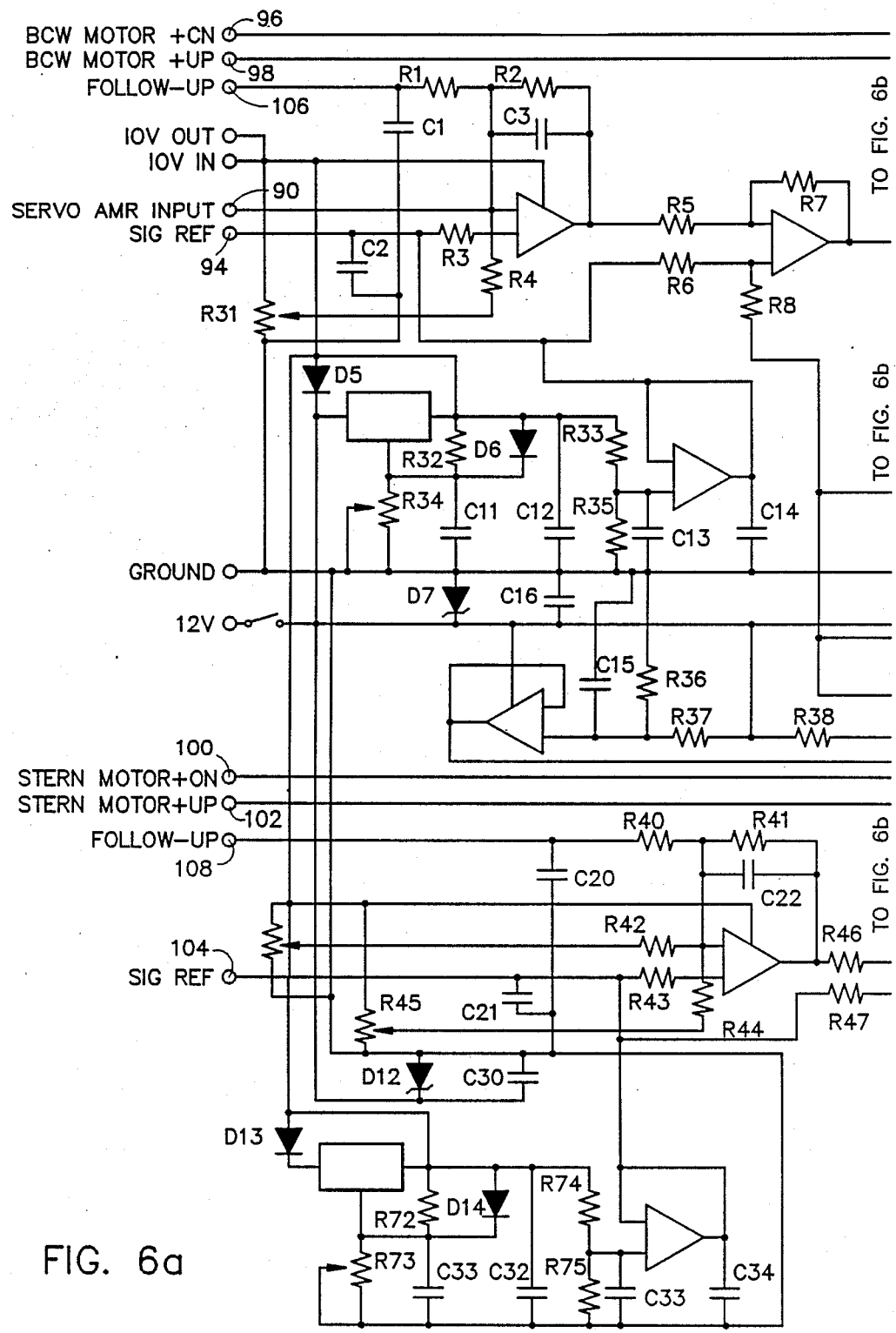
FIGS. 6a–6c together are schematic diagrams illustrating circuitry for the servo/amplifier block of the control system of FIG. 4.
Figure 6B:
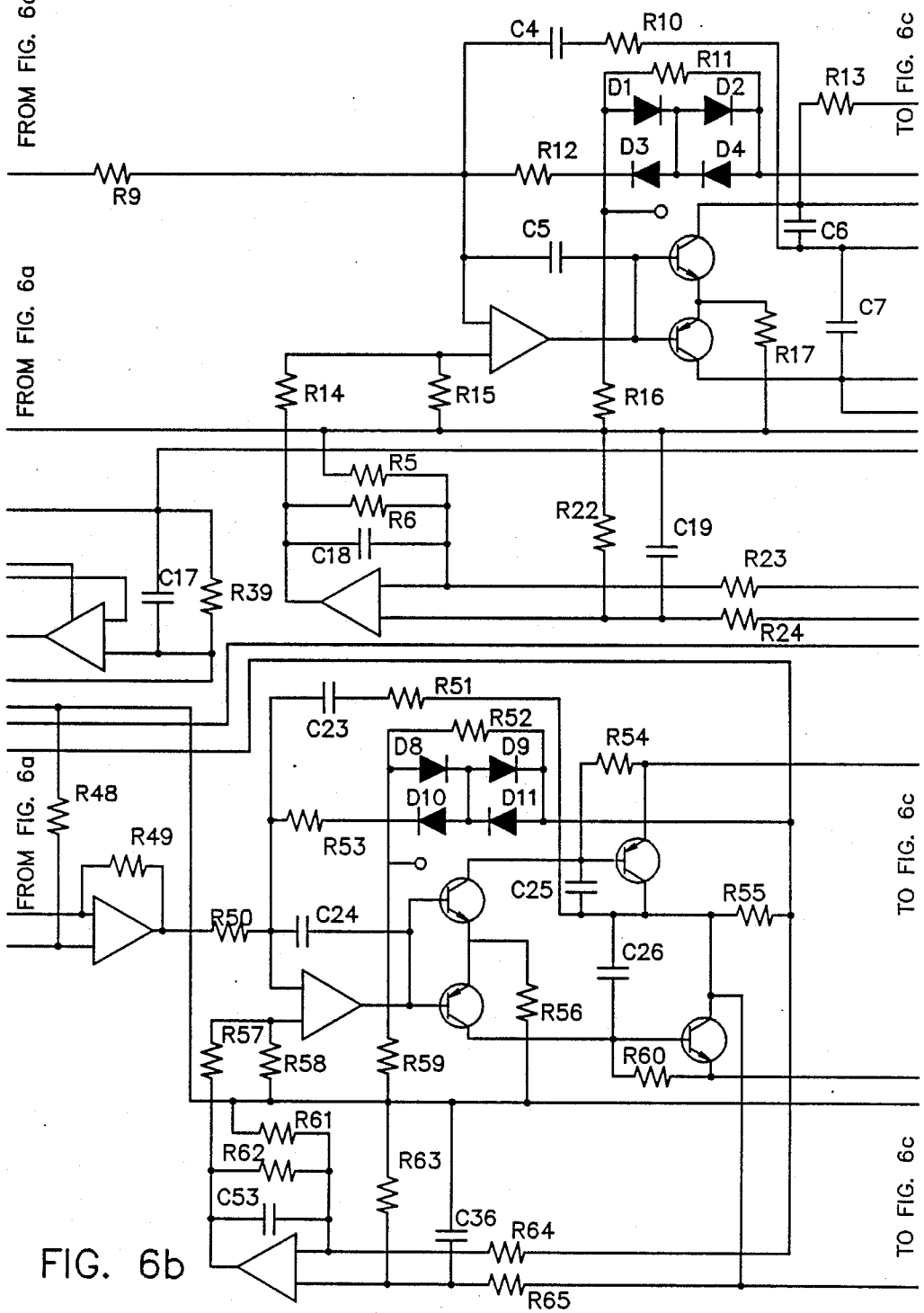
Figure 6C:
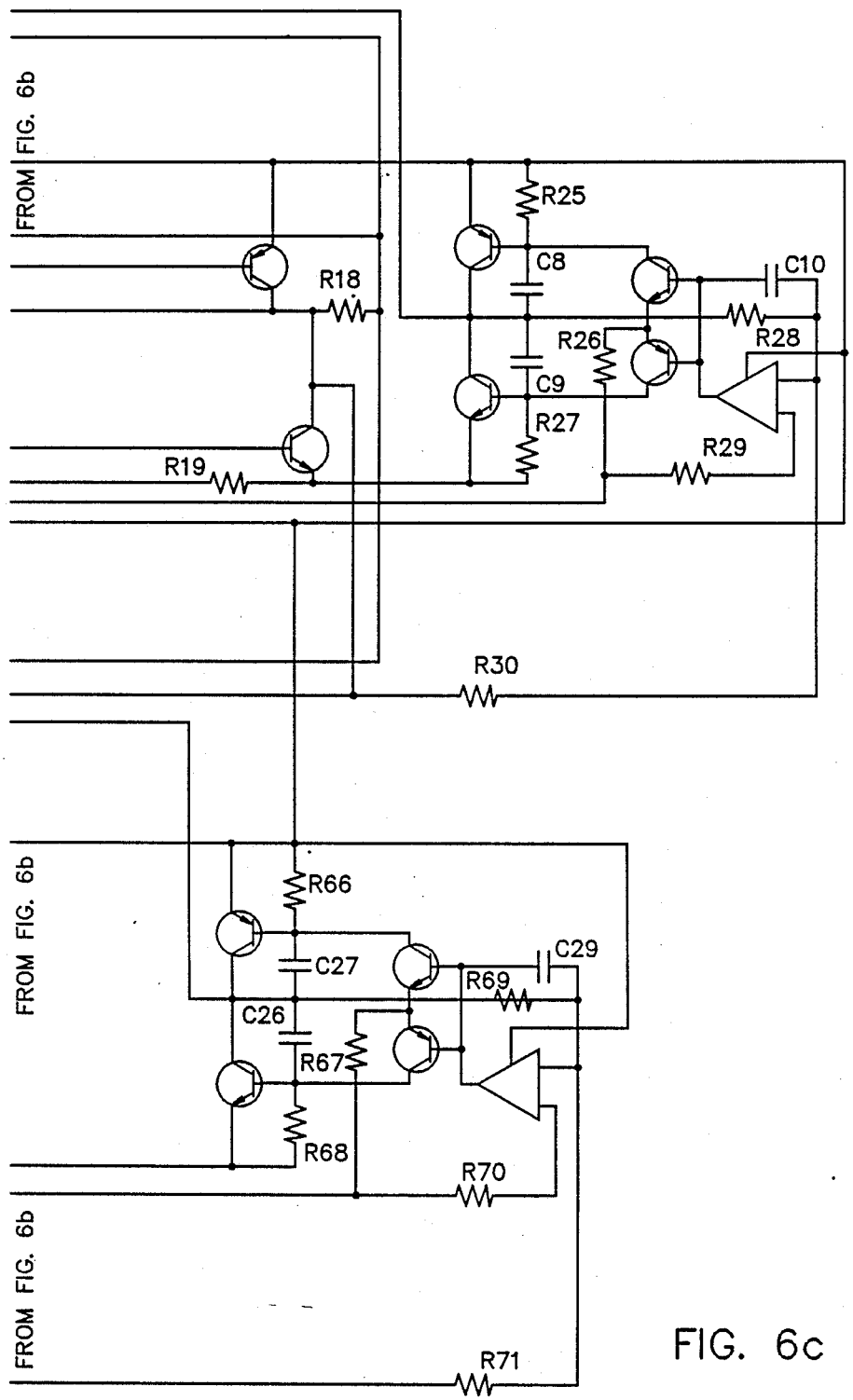

FIGS. 6a–6c together are schematic diagrams of an exemplary circuit the servo/amplifier 49. This circuit includes an input at 90 and a reference signal input at 94. These inputs are from the similarly numbered outputs in the computer/stabilizer circuit of FIG. 5. Output signal terminals 96 and 98 connect to the bow servomotor 50, and terminals 100 and 102 connect to the stern servomotor 60. Terminal 104 provides for reference signal input for the stern servomotor. Follow-up signal terminals are provided at 106 and 108 for the bow and stern respectively. Other functions of the servo/amplifier circuit of FIG. 6 will be readily apparent to those skilled in the art and need not be further described.

In operation, the boat in its normal configuration will have a normal pitch angle when in the planing mode, which will be a pre-established reference angle or plane from which the gyro of the control system will establish a reference plane. The gyro is adjusted to zero or a reference signal at the normal pitch angle of the hull. The gyro is then typically caged (i.e., gimbals locked) until the boat is up to speed (30–70 mph) at which time the control system is activated and takes over. This normal pitch angle of the hull forms a plane from which deviations in this angle will be signaled by the gyro and these signals will command operation of the servo motor or motors to maintain the proper hull pitch.

The control system includes means, in the form of the gyro, responsive to the deviation in the pitch angle from the reference angle for generating a signal, which becomes effective to initiate power to the motors for operating the control or airfoil surfaces. The airfoil surfaces will be moved in a direction to create aerodynamic forces that counteract the hydrodynamic forces as the craft moves through the water. The present system is designed primarily for high speed, lightweight vessels having planing hulls. The system would operate in a range of preferably above about thirty to fifty miles per hour and would operate automatically.

While I have illustrated and described my invention by means of a preferred embodiment, it is to be understood that numerous changes and modifications may be made therein without departing from the spirit and scope of the invention as defined in the appended claims.

I claim:

1. A pitch stabilization system for a high speed planing watercraft comprising in combination:

an elongated planing hull having a bow, a stern, a bottom defining an elongated water contacting planing surface for supporting said hull on the surface of a body of water, and a transverse pitch axis;

variable pitch airfoil means extending outwardly of said hull at the forward end and above the waterline thereof and at a distance from the pitch axis of said hull;

means for sensing a deviation of said hull from a reference pitch angle and generating a signal in response to said deviation; and control means responsive to said signal for varying said airfoil means for maintaining the pitch of said hull substantially aligned with said reference pitch angle.

2. A pitch stabilization system according to claim 1, wherein:

said means for sensing said deviation from said reference pitch angle comprises a gyroscope.

3. A pitch stabilization system according to claim 2 wherein:

said control means comprises a servomotor connected to said airfoil means, a source of power for said servomotor, and means responsive to said gyroscope for controlling the power to said servomotor for moving said airfoil means for maintaining the pitch of said hull aligned with said reference pitch angle.

4. A pitch stabilization system according to claim 1 wherein:

said control means responsive to said deviation for varying said airfoil for maintaining the pitch angle of said hull aligned with said reference angle includes an electrical motor.

5. A pitch stabilization system according to claim 1 wherein:

said variable airfoil means comprises first airfoil means mounted at the bow of said hull, and second airfoil means mounted at the stern of said hull.

6. A pitch stabilization system according to claim 5 wherein:

said second airfoil means is mounted between and at the upper ends of a pair of vertical stabilizers secured to and extending upward from the stern of said hull.

7. A pitch stabilization system according to claim 6 wherein:

said means for sensing said deviation from said reference pitch angle comprises a gyroscope.

8. A pitch stabilization system according to claim 7 wherein:

said control means comprises a servomotor connected to said airfoil means, a source of power for said servomotor, and means responsive to said gyroscope for controlling the power to said servomotor for moving said airfoil means for maintaining the pitch of said hull aligned with said reference pitch angle.

9. A pitch stabilization system according to claim 8 wherein:

said servomotor is electrically operated.

10. An aerodynamically pitch stabilized high speed planing watercraft comprising in combination:

an elongated planing hull having a bow, a stern, an elongated bottom defining an elongated water contacting planing surface extending from said bow to said stern for supporting said hull on the surface of a body of water, and a transverse pitch axis;

first variable airfoil means mounted at the forward end of said hull and extending outwardly therefrom;

means for sensing a deviation of said hull from a reference pitch angle and generating a signal in response to said deviation; and control means responsive to said signal for varying said airfoil means for maintaining the pitch of said hull substantially aligned with said reference angle.

11. A pitch stabilized watercraft according to claim 10 wherein:

said means for sensing said deviation from said reference comprises a gyroscope.

12. A pitch stabilized watercraft according to claim 11 wherein:

said airfoil means comprises a pair of airfoils mounted for rotation together about a common axis and positioned at opposite sides of said hull at the bow thereof, said control means comprises an electric motor connected to said airfoils, a source of electrical power for said motor, and means responsive to said gyroscope for controlling the power to said motor for varying said airfoil for maintaining the pitch of said hull aligned with said reference.

13. A pitch stabilized watercraft according to claim 11 further comprising:

a second variable pitch airfoil mounted between a pair of vertical stabilizers at an aft position of said hull.

14. An aerodynamically pitch stabilized high speed planing watercraft comprising in combination:

an elongated planing hull having an elongated bottom defining an elongated water contacting planing surface for supporting said hull on the surface of a body of water, a bow, a stern, and a transverse pitch axis;

a first variable pitch airfoil mounted at the bow of said hull and extending outwardly therefrom;

a second variable pitch airfoil mounted at the stern of said hull;

means for sensing a deviation of said hull from a reference pitch angle and generating a signal in response to said deviation; and control means responsive to said signal for varying said first and said second airfoils for maintaining the pitch of said hull substantially aligned with said reference angle.

15. A pitch stabilized watercraft according to claim 14 wherein:

said means for sensing said deviation from said reference comprises a gyroscope mounted near the pitch axis of said hull.

16. A pitch stabilized watercraft according to claim 15 wherein:

said airfoil means comprises a pair of airfoils mounted for rotation together about a common axis and positioned at opposite sides of said hull at the bow thereof, said control means comprises an electric motor connected to said airfoils, a source of electrical power for said motor, and means responsive to said gyroscope for controlling the power to said motor for varying said airfoil for maintaining the pitch of said hull aligned with said reference.

17. A pitch stabilization system for a high speed planing watercraft according to claim 16 wherein:

said second variable pitch airfoil is mounted between a pair of vertical stabilizers at an aft position of said hull.

* * * * *